(12) United States Patent
Kjemtrup et al.

(10) Patent No.: US 10,400,682 B2
(45) Date of Patent: Sep. 3, 2019

(54) LARGE TWO-STROKE COMPRESSION-IGNITED INTERNAL COMBUSTION ENGINE WITH FUEL INJECTION SYSTEM FOR LOW FLASHPOINT FUEL AND A FUEL VALVE THEREFORE

(71) Applicant: MAN ENERGY SOLUTIONS, FILIAL AF MAN ENERGY SOLUTIONS SE, TYSKLAND, Copenhagen SV (DK)

(72) Inventors: Niels Kjemtrup, Birkerød (DK); Stefan Mayer, Frederiksberg (DK); Peter Hagen, Dragør (DK)

(73) Assignee: MAN ENERGY SOLUTIONS, FILIAL AF MAN ENERGY SOLUTIONS SE, TYSKLAND, Copenhagen SV (DK)

( * ) Notice: Subject to any disclaimer, the term of this patent is extended or adjusted under 35 U.S.C. 154(b) by 0 days.

(21) Appl. No.: 16/115,794

(22) Filed: Aug. 29, 2018

(65) Prior Publication Data

US 2019/0003406 A1    Jan. 3, 2019

Related U.S. Application Data

(62) Division of application No. 15/600,965, filed on May 22, 2017.

(30) Foreign Application Priority Data

May 26, 2016    (DK) .................................. 201670359

(51) Int. Cl.
*F02D 19/06*    (2006.01)
*F02D 19/10*    (2006.01)
(Continued)

(52) U.S. Cl.
CPC ......... *F02D 19/0686* (2013.01); *F02M 43/02* (2013.01); *F02M 43/04* (2013.01);
(Continued)

(58) Field of Classification Search
CPC .............. F02D 19/0686; F02M 55/002; F02M 55/004; F02M 43/04; F02M 59/00;
(Continued)

(56) References Cited

U.S. PATENT DOCUMENTS 4,440,132 A    4/1984  Terada et al.
5,511,528 A    4/1996  Iwanaga et al.
(Continued)

FOREIGN PATENT DOCUMENTS

DE    10146532 A1    4/2003
DE    10335340 A1    2/2005
(Continued)

OTHER PUBLICATIONS

First Office Action received for Chinese Patent Application No. CN 201710382904.8, dated Mar. 6, 2019, 18 pages including 10 pages machine English translation.
(Continued)

*Primary Examiner* — Jacob M Amick
*Assistant Examiner* — Charles Brauch
(74) *Attorney, Agent, or Firm* — Ziegler IP Law Group, LLC (57) ABSTRACT

A large two-stroke turbocharged compression-ignited internal combustion crosshead engine with a plurality of cylinders has at least one pressure booster for each cylinder for boosting fuel pressure, two or more electronically controlled fuel valves for each cylinder with an inlet of the two or more electronically controlled fuel valves being connected to an outlet of the at least one pressure booster. An electronic control unit is connected to the at least one pressure booster
(Continued)

and the two or more electronically controlled fuel valves. The electronic control unit is configured to determine a start time for a fuel injection event, activate the at least one pressure booster ahead of the determined start time and pen the two or more electronically controlled fuel valves at the determined start time.

7 Claims, 6 Drawing Sheets

(51) Int. Cl.

| | | |
|---|---|---|
| *F02D 29/06* | (2006.01) | |
| *F02D 41/00* | (2006.01) | |
| *F02D 41/38* | (2006.01) | |
| *F02M 43/02* | (2006.01) | |
| *F02M 43/04* | (2006.01) | |
| *F02M 55/00* | (2006.01) | |
| *F02M 57/02* | (2006.01) | |
| *F02M 59/00* | (2006.01) | |
| *F02M 59/46* | (2006.01) | |
| *F02M 61/00* | (2006.01) | |
| *F02M 63/00* | (2006.01) | |

(52) U.S. Cl.
CPC ........ *F02M 55/002* (2013.01); *F02M 55/004* (2013.01); *F02M 57/026* (2013.01); *F02M 59/00* (2013.01); *F02M 61/00* (2013.01); *F02M 63/00* (2013.01); *F02D 19/10* (2013.01); *F02D 29/06* (2013.01); *F02D 41/0007* (2013.01); *F02D 41/0025* (2013.01); *F02D 41/38* (2013.01); *F02D 2041/389* (2013.01); *F02D 2400/04* (2013.01); *F02M 55/005* (2013.01); *F02M 59/462* (2013.01); *F02M 59/464* (2013.01); *F02M 63/0005* (2013.01); *F02M 2200/953* (2013.01); *F02M 2200/956* (2013.01); *Y02T 10/36* (2013.01)

(58) Field of Classification Search
CPC ...... F02M 57/026; F02M 61/00; F02M 43/02; F02M 63/00; F02M 59/464; F02M 55/005; F02M 59/462; F02M 63/0005; Y02T 10/36

See application file for complete search history.

(56) References Cited

U.S. PATENT DOCUMENTS

| | | | |
|---|---|---|---|
| 5,687,693 A | 11/1997 | Chen et al. | |
| 6,073,862 A | 6/2000 | Touchette et al. | |
| 6,513,497 B1 | 2/2003 | Mahr et al. | |
| 2006/0196474 A1 | 9/2006 | Magel | |
| 2008/0041977 A1* | 2/2008 | Hotta | F02M 41/124 239/533.12 |
| 2012/0193188 A1* | 8/2012 | Neelakantan | F16H 61/0031 192/225 |
| 2013/0017107 A1* | 1/2013 | Chang | F04B 1/0421 417/437 |
| 2013/0276408 A1* | 10/2013 | Huo | B65B 17/00 53/440 |

FOREIGN PATENT DOCUMENTS

| | | | |
|---|---|---|---|
| EP | 0651151 A1 | 5/1995 | |
| EP | 0778410 A1 | 6/1997 | |
| EP | 0982492 A2 | 3/2000 | |
| EP | 1114246 A1 | 7/2001 | |
| EP | 1269003 A1 | 1/2003 | |
| EP | 3002444 A1 | 4/2016 | |
| EP | 3009628 A1 | 4/2016 | |
| EP | 3070322 A1 | 9/2016 | |
| JP | S57124032 A | 8/1982 | |
| JP | H04241767 A | 8/1992 | |
| JP | 2000073912 A | 3/2000 | |
| JP | 2002525475 A | 8/2002 | |
| JP | 2004156544 A | 6/2004 | |
| JP | 2009532615 A | 9/2009 | |
| WO | 2007115580 A1 | 10/2007 | |
| WO | 2008145151 A1 | 12/2008 | |
| WO | WO 2010145652 A1 * | 12/2010 | F01L 9/023 |

OTHER PUBLICATIONS

Communication Pursuant to Article 94(3) EPC for European Patent Application No. EP18152102.2, dated Jan. 3, 2019, 5 pages.
Communication Pursuant to Article 94(3) EPC for European Patent Application No. EP18152120.4, dated Jan. 3, 2019, 4 pages.
Japan Patent Office, Notification of Reasons for Refusal, Applicationt No. 2017099263, dated Apr. 16, 2019, 9 pages. (English Translation).

* cited by examiner

LARGE TWO-STROKE COMPRESSION-IGNITED INTERNAL COMBUSTION ENGINE WITH FUEL INJECTION SYSTEM FOR LOW FLASHPOINT FUEL AND A FUEL VALVE THEREFORE

TECHNICAL FIELD

The disclosure relates to large slow-running two-stroke compression-ignited internal combustion crosshead engines with a fuel injection system for injecting a low flashpoint fuel into the combustion chambers.

BACKGROUND

Large two-stroke uniflow turbocharged compression-ignited internal combustion crosshead engines are typically used in propulsion systems of large ships or as prime mover in power plants. The sheer size, weight and power output renders them completely different from common combustion engines and places large two-stroke turbocharged compression-ignited internal combustion engines in a class for themselves.

Large two-stroke turbocharged compression-ignited internal combustion engines of the crosshead type are typically used in propulsion systems of large ships or as prime mover in power plants.

Large two-stroke compression-ignited internal combustion engines are conventionally operated with a liquid fuel such as e.g. fuel oil or heavy fuel oil but increased focus on environmental aspects has led to the development towards using alternative types of fuel such as gas, methanol, coal slurry, petroleum coke and the like. One group of fuels that is in increasing demand are low flashpoint fuels.

Many low flashpoint fuels, such as methanol, ethanol, LPG, DME or biofuel, naphta, gasoline (petrol), crude gasoline, crude oil are relatively clean fuels that result in significantly lower levels of sulfurous components, NOx and $CO_2$ in the exhaust gas when used as fuel for a large low-speed uniflow turbocharged two-stroke internal combustion engine when compared with e.g. using heavy fuel oil as fuel.

However, there are problems associated with using a low flashpoint fuels in a large low-speed uniflow turbocharged two-stroke internal combustion engine. One of those problems is the low flashpoint, which causes significant problems if low flashpoint fuel leaks into one of the other systems of the engine and mixes with another fluid, such as e.g. the lubrication oil system. Low flashpoint fuel, is inherently easy to ignite and vapors thereof can easily form explosive mixtures. Thus, should low flashpoint find its way into another system of the engine it is necessary to stop the engine operation for safety reasons and to clean or replace all of the liquid in such a system, a costly and cumbersome affair for the operator of the engine.

The timing of the fuel injection highly affects the combustion pressure in a Diesel engine (compression-ignited engine) and therefore the timing of the fuel injection in a compression-ignited engine needs to be controlled very accurately.

It is known in the art to provide large two-stroke compression ignited internal combustion engines with a common rail type system that stores and distributes the gas at the required injection pressure of typically several hundred bar (depending on the type of gas and the engine requirements), with accumulators close to the fuel valves. The common rail type system is connected to two or three fuel injection valves in the cylinder cover of each cylinder. The fuel injection valves are electronically controlled and fuel injection is timed by electronically (the signal originates in an electronic control unit but the actual signal to the fuel valve is typically a hydraulic signal, i.e. electronic signal is converted to a hydraulic signal between the electronic control unit and the fuel valve) controlling the time (relative to the engine cycle) at which the fuel injection valve is opened.

The amount of fuel admitted to a cylinder in one injection event is electronically controlled by the length of the time interval from the opening of the fuel valve to the closing of the fuel valve. In order to ensure safety against ill-timed and/or unlimited injection the so-called window valve is provided between the accumulator and the fuel valve. Thus the maximum amount of fuel that can be injected when e.g. a fuel valve is stuck in its open position is the amount of fuel gas that is present in the system between the window valve and the fuel valve, which is a relatively small and therefore safe amount.

The known common rail type gaseous fuel supply system for large two-stroke compression-ignited internal combustion engines have disadvantages when operating on LPG or any other similar low flashpoint fuel with a relatively high compressibility. The injection pressure for LPG needs to be as high as 600 bar, which means that the common rail system including all valves, accumulators, pipes, etc., needs be laid out for this high pressure. Furthermore, the safety concept with the window valves is not well suited for dense gas like LPG, since firstly the gas channels between window valve and fuel valve need to have a very small volume and secondly, monitoring of the gas channel pressure necessary to ensure detection of leakages is made very difficult due to high frequency oscillation excited from closing of the window valve.

It is also known in the art to use booster pumps and fuel pressure controlled fuel valves for injecting liquid gas, such as e.g. LPG. This concept has the problem associated therewith that the compressibility of LPG is rather large and dependent on pressure, temperature and gas composition. Hence, the delay between the actuation of the pressure booster and the actual gas injection is dependent on those parameters, which will make engine control, i.e. injection amount and particularly injection timing, very difficult. This is a significant problem, since injection timing is critical in compression-ignited engines.

There is therefore a need to provide a fuel supply system for LPG and similar low flashpoint fuels that is safe, inexpensive and provides accurate control of the timing of the fuel admission into the cylinders.

SUMMARY

The aspects of the disclosed embodiments are directed to provide a large two-stroke turbocharged compression-ignited internal combustion crosshead engine that overcomes or at least reduces the problem indicated above.

The foregoing and other objects are achieved by the features of the independent claims. Further implementation forms are apparent from the dependent claims, the description and the figures.

According to a first aspect there is provided a large two-stroke turbocharged compression-ignited internal combustion crosshead engine comprising:
a plurality of cylinders,
at least one pressure booster for each cylinder for boosting fuel pressure, two or more electronically controlled fuel valves for each cylinder with an inlet of said two or more electronically controlled fuel valves being connected to an outlet of said at least one pressure booster, an electronic control unit operably connected to said at least one pressure booster and said two or more electronically controlled fuel valves, said electronic control unit being configured to:

determine a start time for a fuel injection event, activate said at least one pressure booster ahead of the determined start time, open the two or more electronically controlled fuel valves at the determined start time.

By providing a fuel supply system with a pressure booster that boosts the pressure delivered to the fuel valve from a moment in time in the engine cycle sufficiently in advance of the earliest possible start of the fuel injection event until the latest possible end of the fuel injection event combined with a fuel valve in which the opening and closing of the fuel valve is electronically controlled and not dependent of the pressure of the supply fuel, a fuel supply system can be provided with the following advantages:

no large gas accumulator is needed, no windows valve is needed that in the past has caused many problems injection timing and duration can be accurately controlled no need for a large gas accumulator, online check for leaking GI injection valve is easily obtained by monitoring the booster pressure, booster pressure can be measured on the hydraulic side which is much simpler and easier that on the fuel side, despite having a common rail derived injection valve, still injection pressure control and shaping is possible, in case of fuel valve leakage no gas can entrain into the gas supply side.

According to a first possible implementation of the first aspect the electronic control unit is configured to determine said start time for each cylinder of said plurality of cylinders for each engine cycle.

According to a second possible implementation of the first aspect the electronic control unit is configured to activate the at least one pressure booster ahead of the determined start time by a time span determined by said electronic control unit.

According to a third possible implementation of the first aspect the electronic control unit is configured use a fixed time span, a time span obtained from a lookup table stored in said electronic control unit or a time span determined by said electronic control unit using an algorithm stored in said electronic control unit.

According to a fourth possible implementation of the first aspect the opening and closing of said electronically controlled fuel valves is controlled by a control signal from said electronic control unit.

According to a fifth possible implementation of the first aspect the opening and closing of said electronically controlled fuel valves is independent from the pressure in the fuel supplied to the electronically controlled fuel valves.

According to a sixth possible implementation of the first aspect the electronic control unit is configured to determine the duration of a fuel injection event and wherein the electronic control unit is configured to close said at least two electronically controlled fuel valves at the end of said duration and configured to deactivate said at least one pressure booster at the end of said duration.

According to a seventh possible implementation of the first aspect each fuel valve comprises an elongated valve housing and wherein said pressure booster is disposed inside said elongated valve housing.

According to an eighth possible implementation of the first aspect the pressure booster comprises a pump piston (80) received in a first bore in said valve housing with a pump chamber in said first bore on one side of said pump piston, an actuation piston received in a second bore in said valve housing with an actuation chamber in said second bore (84) on one side of said actuation piston, said pump piston being connected to said actuation piston to move in unison therewith, said actuation chamber being connected to an actuation fluid port, said pump chamber having an outlet connected to a fluidic connection to the nozzle holes of the nozzle of said fuel valve.

According to a ninth possible implementation of the first aspect the fuel valve is provided with a valve needle that controls the flow of fuel to nozzle holes of the nozzle of said fuel valve, the position of said valve needle preferably being controlled by a control signal and not by the fuel pressure.

According to a tenth possible implementation of the first aspect the pressure booster and said fuel valve are adapted to operate with a low flashpoint fuel, preferably a low flashpoint fuel that is more compressible than fuel oil.

According to an eleventh possible implementation of the first aspect the engine further comprises a conduit for supplying sealing liquid to a clearance between a bore of the pressure booster and a pump piston slidably received in said bore of the pressure booster.

According to a twelfth possible implementation of the first aspect the engine further comprises a conduit for supplying sealing liquid to a clearance between a bore of the fuel valve and valve needle slidably received in said bore of the fuel valve.

According to a second aspect, there is provided fuel valve for injecting low flashpoint liquid fuel into the combustion chamber of a large slow running two-stroke turbocharged self-igniting internal combustion engine, said fuel valve comprising:

an elongated fuel valve housing with a rear end and a front end, a nozzle with a plurality of nozzle holes, said nozzle being disposed at the front end of said elongated valve housing, a fuel inlet port in said elongated valve housing for connection to a source of pressurized liquid low flashpoint fuel, an actuation fluid port in said elongated fuel valve housing for connection to a source of actuation fluid, an axially displaceable valve needle slidably received in a longitudinal bore in said fuel valve, said valve needle having a closed position and an open position and said valve needle being biased towards said closed position, said valve needle allowing flow of fuel from a fuel cavity to said plurality of nozzle holes when the valve needle is in its open position and said valve needle preventing flow of fuel from said fuel cavity to said plurality of nozzle holes when the valve needle is in its closed position, said valve needle being operably connected to a needle actuation piston with a pressure surface of said actuation piston facing a needle actuation chamber in said fuel valve, said needle actuation chamber being fluidically connected to a needle actuation fluid port in said fuel valve, a pump piston received in a first bore in said valve housing with a pump chamber in said first bore on one side of said pump piston, an actuation piston received in a second bore in said valve housing with an actuation chamber in said second bore (84) on one side of said actuation piston, said pump piston being connected to said actuation piston to move in unison therewith, said actuation chamber being connected to an actuation fluid port, said pump chamber having an outlet fluidically connected to said fuel cavity and an inlet fluidically connected to said fuel inlet port.

By providing the fuel valve with a pressure booster and a valve needle where lift is controlled by an actuation pressure and not by fuel pressure, a fuel valve is created that can handle low flashpoint fuels that are more compressible than regular fuel oil without the need for a common rail system.

According to a first possible implementation of the second aspect the fuel valve comprises a sealing liquid inlet port for connection to a source of pressurized sealing liquid, and a conduit connecting said sealing liquid inlet port (70) to said first bore for sealing said pump piston in said first bore.

According to a second possible implementation of the second aspect the fuel valve further comprises a conduit connecting said sealing liquid inlet port to said longitudinal bore for sealing said valve needle in said longitudinal bore.

According to a third possible implementation of the second aspect the effective pressure area of said pump piston (80) is smaller than the effective pressure area of said actuation piston.

According to a fourth possible implementation of the second aspect the nozzle is part of a body that is secured to the front of said elongated valve housing.

According to a fifth possible implementation of the second aspect the inlet is located in said pump piston.

According to a sixth possible implementation of the second aspect a first one-way valve is provided in said inlet, said first one-way valve being configured to allow flow of low flashpoint fuel through said inlet into said pump chamber and to prevent flow from said pump chamber into said inlet.

According to a seventh possible implementation of the second aspect the outlet of said pump chamber is connected to said fuel cavity by one or more fuel channels.

According to an eighth possible implementation of the second aspect a second one-way valve is provided in said one or more fuel channels, said second one-way valve being configured to allow flow of low flashpoint fuel from said pump chamber to said fuel cavity and to prevent flow from said fuel cavity to said pump chamber.

According to a ninth possible implementation of the second aspect the valve needle rests on a valve seat in said closed position and said valve needle has lift from said valve seat in said open position.

According to a third aspect, there is provided a fuel valve for injecting low flashpoint liquid fuel into the combustion chamber of a large slow running two-stroke turbocharged self-igniting internal combustion engine, said fuel valve comprising:

an elongated fuel valve housing with a rear end and a front end, a nozzle with a plurality of nozzle holes, said nozzle being disposed at the front end of said elongated valve housing, a fuel inlet port in said elongated fuel valve housing for connection to a source of pressurized liquid low flashpoint fuel, an actuation fluid port in said elongated fuel valve housing for connection to a source of actuation fluid, an axially displaceable valve needle slidably received in a longitudinal bore in said fuel valve, said valve needle having a closed position and an open position and said valve needle being biased towards said closed position, said valve needle allowing flow of fuel from a fuel cavity to said plurality of nozzle holes when the valve needle is in its open position and said valve needle preventing flow of fuel from said fuel cavity to said plurality of nozzle holes (56) when the valve needle is in its closed position, a pump piston received in a first bore in said valve housing with a pump chamber in said first bore on one side of said pump piston, an actuation piston received in a second bore in said valve housing with an actuation chamber in said second bore on one side of said actuation piston, said pump piston being connected to said actuation piston to move in unison therewith, said actuation chamber being connected to an actuation fluid port, said pump chamber having an outlet fluidically connected to said fuel cavity and an inlet fluidically connected to said fuel inlet port, a sealing liquid inlet port for connection to a source of pressurized sealing liquid, a conduit connecting said sealing liquid inlet port to said first bore for sealing said pump piston in said first bore, a conduit connecting said sealing liquid inlet port to said longitudinal bore at a first position along the length of said longitudinal bore for sealing said valve needle in said longitudinal bore, a conduit connecting the low flashpoint fuel supply port to the said longitudinal bore at a second position along the length of said longitudinal bore, said second position being closer to said fuel cavity than said first position.

By providing a conduit connecting the low flashpoint fuel supply port to the said longitudinal bore at a second position, a position being closer to said fuel cavity than said first position of the sealing liquid, the high sealing oil does not have to seal against the boosted fuel pressure (injection pressure) of several hundred bar (which would require an even higher sealing liquid pressure). Instead, the fuel is allowed to leak back to the fuel supply system at a pressure which is significantly lower that the injection pressure. Thus, the high pressure fuel area in the clearance between the valve needle and the longitudinal bore is punctured by the connection to the fuel supply port and the sealing liquid needs only to seal against the much lower fuel supply pressure.

According to a first possible implementation of the third aspect the valve needle rests on a valve seat in said closed position and said valve needle has lift from said valve seat in said open position.

According to a second possible implementation of the third aspect the nozzle has a nozzle body that is secured to the front of said elongated valve housing.

According to a third possible implementation of the third aspect the valve seat is located in the tip of said nozzle.

According to a fourth possible implementation of the third aspect the longitudinal bore is formed at least partially in said nozzle body.

According to a fifth possible implementation of the third aspect lift of said valve needle is controlled by the fuel pressure.

These and other aspects will be apparent from the embodiments described below.

BRIEF DESCRIPTION OF THE DRAWINGS

In the following detailed portion of the present disclosure, the aspects and possible implementations will be explained in more detail with reference to the example embodiments shown in the drawings, in which.

DETAILED DESCRIPTION

In the following detailed description, an internal combustion engine will be described with reference to a large two-stroke low-speed turbocharged compression-ignited internal combustion engine with crossheads in the example embodiments, but it is understood that the internal combustion engine could be of another type, such as a two-stroke Otto, a four-stoke Otto or Diesel, with or without turbocharging, with or without exhaust gas recirculation.

Figure 1:
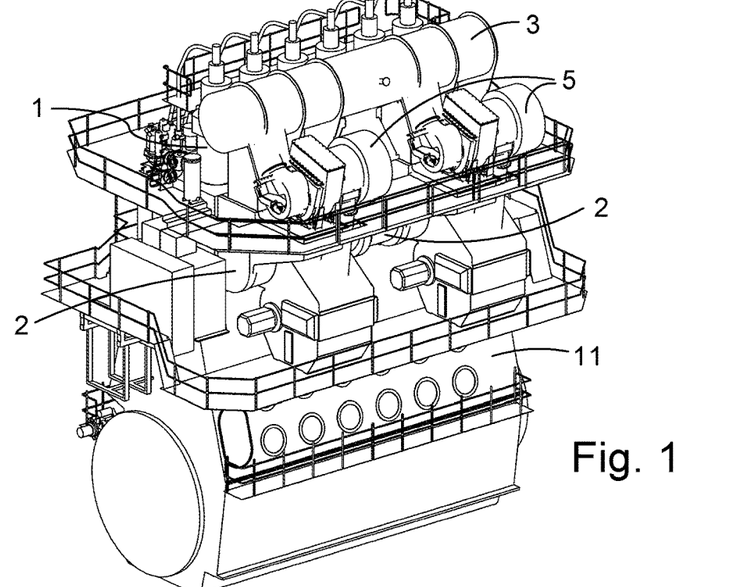
FIG. 1 is an elevated front view of a large two-stroke diesel engine according to an example embodiment.
Figure 2:
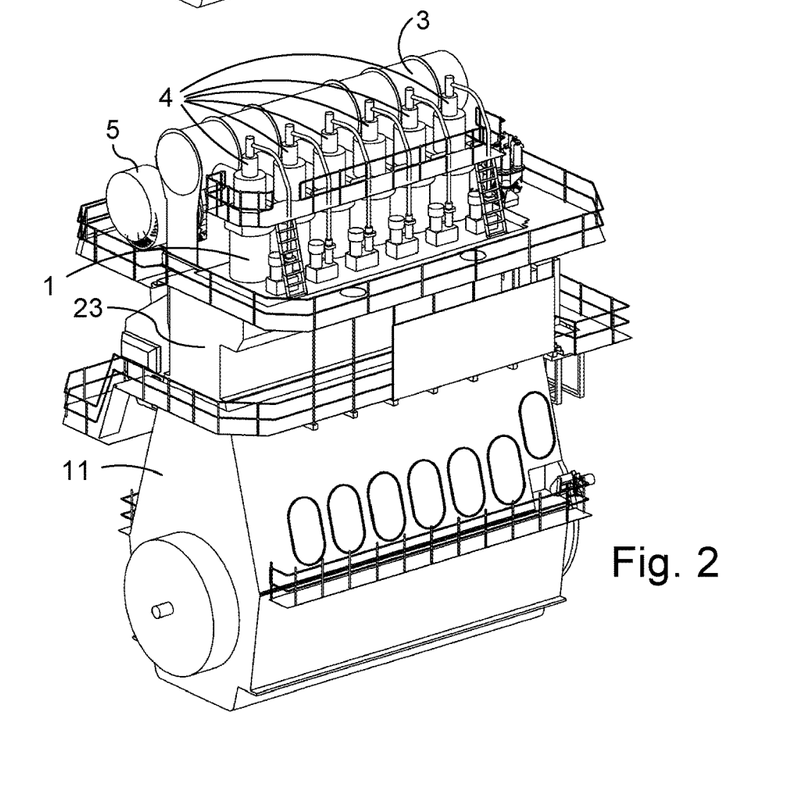
FIG. 2 is an elevated side view of the large two-stroke engine of FIG. 1.
Figure 3:
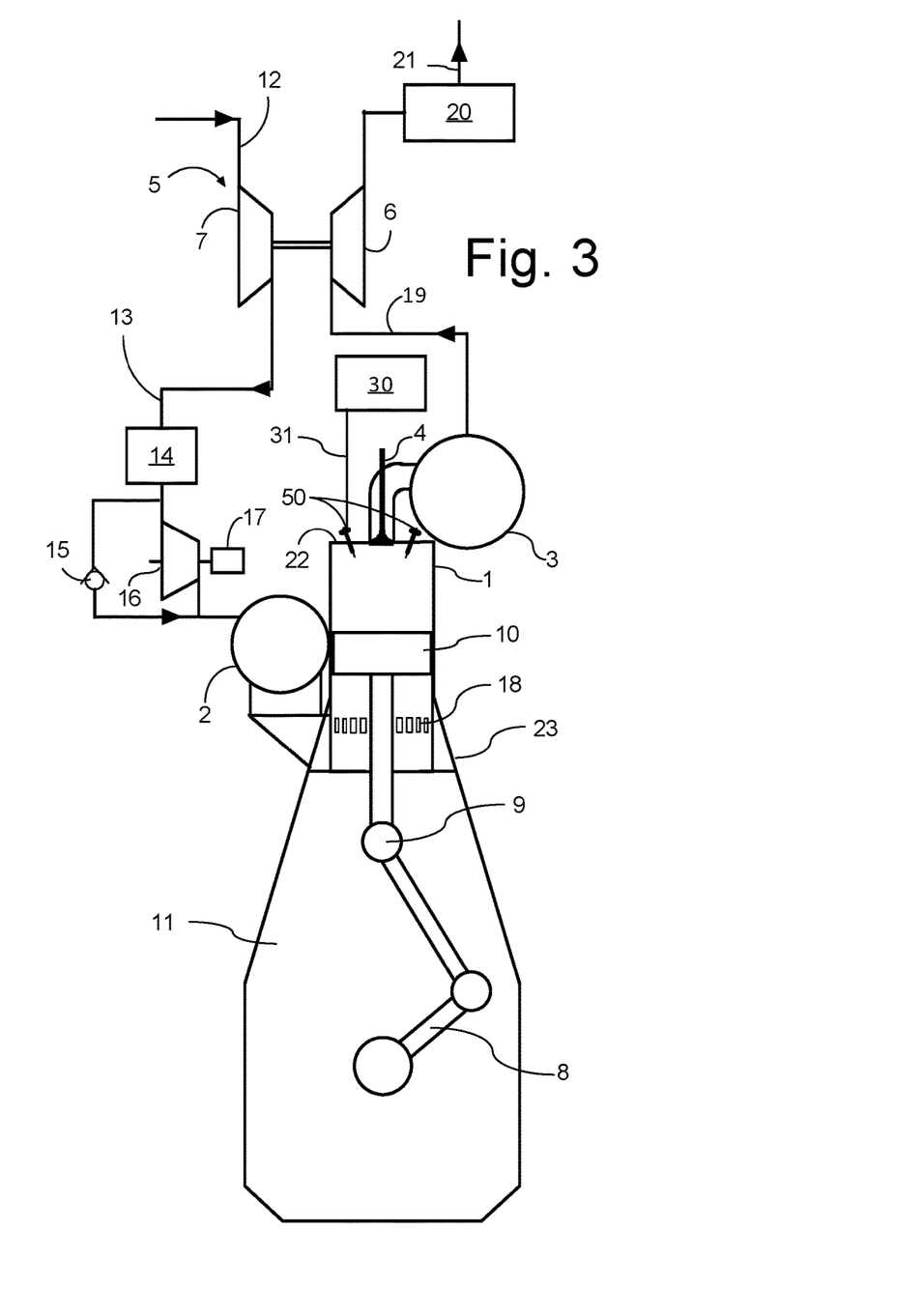
FIG. 3 is a diagrammatic representation the large two-stroke engine according to FIG. 1.

FIGS. 1, 2 and 3 show a large low-speed turbocharged two-stroke diesel engine with a crankshaft 8 and crossheads 9. FIG. 3 shows a diagrammatic representation of a large low-speed turbocharged two-stroke diesel engine with its intake and exhaust systems. In this example embodiment the engine has six cylinders in line. Large low-speed turbocharged two-stroke diesel engines have typically between four and fourteen cylinders in line, carried by a cylinder frame 23 that is carried by an engine frame 11. The engine may e.g. be used as the main engine in a marine vessel or as a stationary engine for operating a generator in a power station. The total output of the engine may, for example, range from 1,000 to 110,000 kW.

The engine is in this example embodiment a compression-ignited engine of the two-stroke uniflow type with scavenge ports 18 at the lower region of the cylinder liners 1 and a central exhaust valve 4 at the top of the cylinder liners 1. The scavenge air is passed from the scavenge air receiver 2 to the scavenge ports 18 of the individual cylinders 1. A piston 10 in the cylinder liner 1 compresses the scavenge air, fuel is injected through fuel valves 50 in the cylinder cover 22, combustion follows and exhaust gas is generated.

When an exhaust valve 4 is opened, the exhaust gas flows through an exhaust duct associated with the cylinder 1 into the exhaust gas receiver 3 and onwards through a first exhaust conduit 19 to a turbine 6 of the turbocharger 5, from which the exhaust gas flows away through a second exhaust conduit via an economizer 20 to an outlet 21 and into the atmosphere. Through a shaft, the turbine 6 drives a compressor 7 supplied with fresh air via an air inlet 12. The compressor 7 delivers pressurized scavenge air to a scavenge air conduit 13 leading to the scavenge air receiver 2. The scavenge air in the scavenge air conduit 13 passes an intercooler 14 for cooling the scavenge air.

The cooled scavenge air passes via an auxiliary blower 16 driven by an electric motor 17 that pressurizes the scavenge air flow when the compressor 7 of the turbocharger 5 does not deliver sufficient pressure for the scavenge air receiver 2, i.e. in low or partial load conditions of the engine. At higher engine loads the turbocharger compressor 7 delivers sufficient compressed scavenge air and then the auxiliary blower 16 is bypassed via a non-return valve 15.

The engine is operated with a low flashpoint fuel, such as e.g. LPG, methanol or naphta and supplied by a low flashpoint fuel supply system 30 in liquid or supercritical form at a substantially stable pressure and temperature. However, depending on the details of the low flashpoint fuel supply system and the type of gas supplied slight variations in temperature and pressure are unavoidable. Further, slight variations in the composition of the low flashpoint fuel can also occur.

The low flashpoint fuel supply system 30 supplies the fuel injection valves 50 with low flashpoint fuel at relatively low supply pressure (e.g. 8 to 100 Bar pressure) via a supply conduit 31.

Figures 4, 10:
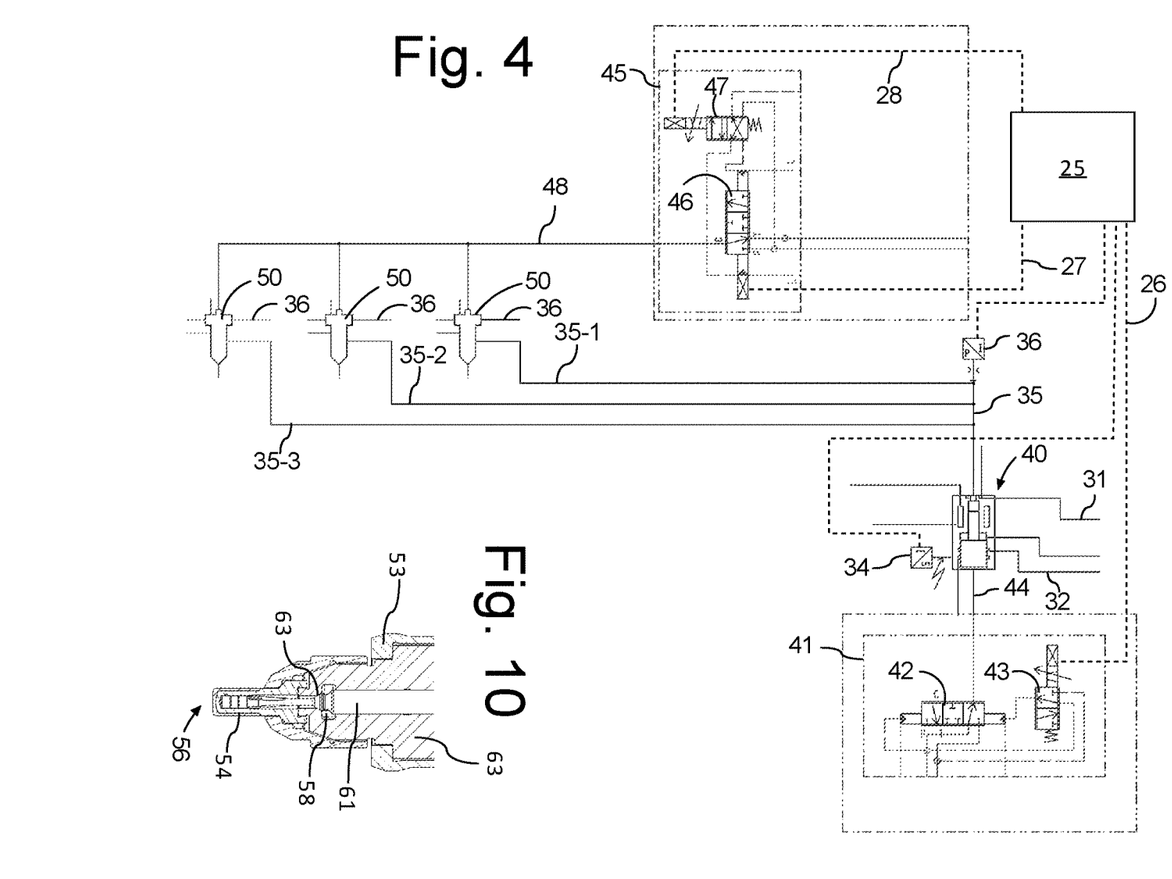
FIG. 4 is a diagrammatic representation of the fuel injection system for injecting a low flashpoint fuel into the engine of FIGS. 1 and 2.
FIG. 10 illustrates an alternative nozzle for the fuel valve of FIG. 5.

FIG. 4 is a diagram showing the fuel injection system that receives the low flashpoint fuel via the supply conduit 31. The fuel injection system comprises a pressure booster 40 for pressurizing the fuel to the injection pressure. The pressure booster 40 that is hydraulically actuated under control of a first control valve 41 and fuel valves 50 that are hydraulically actuated under control of a second control valve 45.

The diagram in FIG. 4 shows the fuel injection system for a single cylinder 1, with one pressure booster 40 and three fuel injection valves 50. Instead of three, there could also be two fuel valves 50 for each cylinder 1. Each cylinder 1 will require a pressure booster 40 supplying two or three fuel valves 50.

The pressure booster 40 comprises a large diameter plunger connected to a smaller diameter plunger to move in unison therewith. The large diameter plunger and the small diameter plunger are received in respective matching bores in the housing of the pressure booster 40. The large diameter plunger faces an actuation chamber that is supplied with high pressure hydraulic fluid or with tank under control of the first control valve 41.

The small diameter plunger faces a pump chamber that is connected to the fuel supply line 31 via a one-way valve and to a high-pressure fuel supply line 35 for the delivery of high pressure fuel to the fuel valves 50. A one-way valve prevents backflow of fuel from the high-pressure fuel supply line 35 to the pump chamber. The pressure in the fuel in the supply line 31 is sufficient to cause the pressure booster 40 to make a return stroke when the actuation chamber is connected to tank. A position sensor 34 senses the position of the large and small diameter plungers. Sealing liquid, such as sealing oil is supplied to the clearance between the large diameter piston and the bore in which it is received for preventing fuel leaking into the pressure chamber and mixing with the hydraulic fluid. A pressure sensor 36 senses the pressure in the high-pressure fuel supply line 35.

In the present embodiment the first control valve 41 comprises a preferably proportional first hydraulically controlled three-way valve 42. The first three-way valve 42 is connected to the actuation chamber via a actuation conduit 44, to a source of high-pressure hydraulic fluid and to tank. The first three-way valve 42 is configured to connect the actuation chamber selectively to tank or to the source of high-pressure hydraulic fluid. Since the first hydraulically controlled three-way valve 42 is in an embodiment a proportional valve capable of assuming any intermediate position between connection to the source of high-pressure hydraulic fluid and tank. The position of the first three-way valve 42 is controlled by a first smaller two-way valve 43 and the position of the first smaller two-way valve 43 is electronically controlled. The first smaller two-way valve 43 is connected to an electronic control unit 25 via a first signal cable 26. In an embodiment, the first control valve 41 is under command of a separate electronic control unit that is mainly configured for maintaining safety and will deactivate the pressure booster when a safety issue, such as e.g. a gas leak, has been detected. Alternatively, the first control valve is connected to a source of high pressure hydraulic fluid that is controlled by an engine safety system.

The high-pressure fuel supply line 35 is split up into three high-pressure fuel supply lines 35-1, 35-2, 35-3, i.e. one high-pressure fuel supply line for supplying each fuel valve 50 with high-pressure low flashpoint fuel. In an embodiment with two fuel valves 50 per cylinder the high-pressure fuel supply line 35 will be split in two lines.

Each fuel valve 50 is connected to a supply of sealing oil via a sealing oil supply line 36 and with a sealing oil return line. The flow sealing oil through the fuel valve 50 is in an embodiment relatively large so that the sealing oil also acts as a cooling medium for the fuel valve 50.

Each fuel valve 50 is connected to a fuel valve actuation signal conduit 48. The pressure in the fuel valve actuation signal conduit 48 is controlled by a second control valve 45 that comprises in an embodiment a second hydraulically controlled proportional three-way valve 46 and a second smaller electronically controlled two-way valve 47. The second hydraulically controlled three-way valve 46 is preferably a proportional valve and is configured to connect the actuation signal conduit 48 to a source of high-pressure hydraulic fluid or to tank. Since the second hydraulically controlled three-way valve 46 is in an embodiment a proportional valve it is capable of assuming any intermediate position between connection to the source of high-pressure hydraulic fluid and tank. The position of the second three-way valve 46 is controlled by a second smaller two-way valve 47 and the position of the second smaller two-way valve 47 is electronically controlled. The second smaller two-way valve 47 is connected to the electronic control unit 25 via a third signal cable 28. The electronic control unit 25 is informed of the position of the second three-way valve 46 via a second signal cable 27.

The electronic control unit 25 is in receipt of signals from various sensors via signal cables that are illustrated in FIG. 4 as interrupted lines. The signals from the various sensors include e.g. scavenging pressure and temperature, exhaust pressure and temperature and crank angle and speed, although it is noted that this list is not exhaustive and will depend on the construction of the engine, for example whether it includes exhaust gas recirculation or not, whether it includes a turbocharger or not, etc. The electronic control unit 25 controls the fuel injection valves 50 i.e. the electronic control unit determines when the fuel valve 31 is open and determines the duration of the opening time. The electronic control unit 25 also controls the operation of the pressure booster 40.

The timing of the fuel injection highly affects the combustion pressure in the large two-stroke turbocharged diesel engine (compression-ignited engine). The timing of the opening of the fuel valves 50 relative to the crankshaft angle or relative to the engine cycle largely determines the combustion pressure. The duration of the opening of the fuel valves 50 determines the amount of fuel admitted to the cylinders 1, with increasing duration leading to increasing amount of fuel being admitted to the cylinders 1.

The electronic control unit 25 is configured to control the timing of the opening of the fuel valves by an electronic signal to the control valve 45 via the third signal cable 28. Upon receipt of the signal the electronic control valve switches position and connects the actuation signal conduit 48 to the source of high-pressure hydraulic fluid. The high pressure in the actuation signal conduit 48 opens the fuel valve 50.

In order to ensure that the fuel with a sufficient pressure for injection is ready to be injected when the fuel valve 50 opens, the electronic control unit 25 activates the pressure booster 40 before opening the fuel valve 50. The advanced activation of the pressure booster 40 is necessary to build up pressure in the relatively compressible low flashpoint fuel. The electronic control unit 25 can be configured to activate the pressure booster 40 in advance of opening the fuel valve 55 by a fixed, predetermined length of time, obtained e.g. from test runs or the electronic control unit 25 can be configured to determine the appropriate time between activation of the pressure booster 40 and opening the fuel valve 50 using an algorithm stored in the electronic control unit 25. The algorithm may in an embodiment take e.g. the engine load, the engine speed and fuel properties into account.

By timely activating the pressure booster 40, the pressure in the high-pressure supply lines 35-1, 35-2 and 35-3 is build up to the appropriate injection pressure of several hundred bar (can be as much a 600 bar) before the electronic control unit 25 instructs the fuel valves 50 to open.

The electronic control unit 25 is configured to determine the duration of the opening of the fuel valves based on various parameters, such as e.g. engine load, engine speed and fuel properties and the electronic control unit closes the fuel valves 50 when the required duration of the injection event has been reached. Simultaneously, the electronic control unit 25 instructs the pressure booster 40 to make a return stroke, i.e. to refill the pump chamber and deplete the actuation chamber by instructing the first control valve 41 to connect the actuation chamber to tank, whereupon the pressure in the fuel supply line 31 causes the pressure booster 40 to make a return stroke filling the pump chamber with fuel and emptying the actuation chamber for hydraulic fluid.

In the embodiment above the pressure booster 40 and the fuel valve 50 are separate physical units. In an embodiment the pressure booster 40 is an integral part of the fuel valve 50.

An embodiment of a fuel valve 50 with such an integrated pressure booster is shown in FIGS. 5 to 9.

Figure 5:
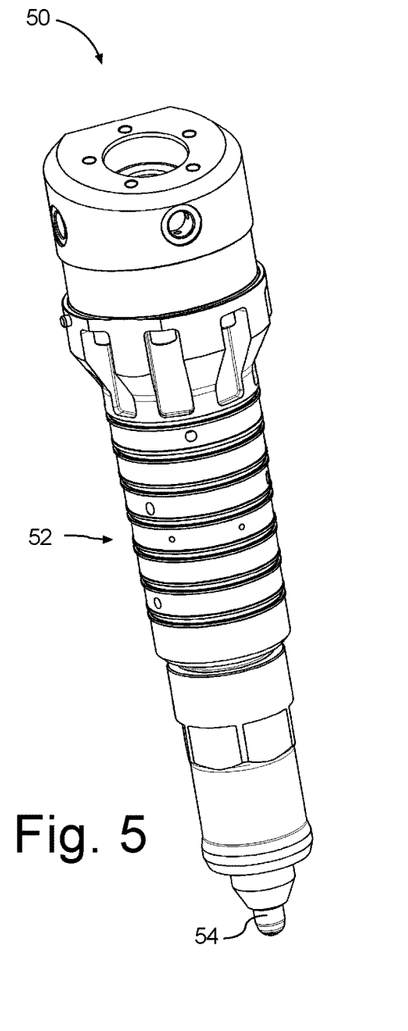
FIG. 5 is an elevated view of a fuel valve for according to an embodiment.

FIG. 5 is a perspective view of the fuel valve 50 with its elongated valve housing 52, a nozzle 54 secured to the front end of the elongated valve housing 52. The nozzle 54 is provided with a plurality of nozzle holes 56 for creating jets of fuel into the combustion chamber. The nozzle 54 is removably secured to the elongated valve housing 52, so that it can be easily replaced if the nozzle 54 should fail or be worn out.

FIGS. 6, 7, 8 and 9 show different sectional views of the fuel valve 50. The fuel valve 50 has an elongated valve housing 52 with a rearmost end and a nozzle 54 at its front end. The nozzle 54 is a separate body that is attached to the front end of the valve housing 52. The rearmost end of the valve housing 52 is provided with a plurality of ports, including a control port 86, an actuation fluid port 78 and a gas leak detection port (not shown). The rearmost end is enlarged to form a head that protrudes from the cylinder cover when the fuel valve 50 is mounted in the cylinder cover. In the present embodiment, the fuel valves 50 are placed around the central exhaust valve 4, i.e. relatively close to the wall of the cylinder liner. The elongated valve housing 52 and the other components of the fuel injection valve 50, as well as the nozzle are in embodiment made of steel, such as e.g. tool steel or stainless steel.

The nozzle 54 is provided with nozzle holes that are connected to the interior in the nozzle 54 and the nozzle holes are arranged in different directions in order to distribute the fuel in the combustion chamber. The nozzle holes are directed away from the cylinder liner which is relatively nearby due to the location of the fuel valve 50 in the cylinder head. The nozzles holes are arranged in the tip 56 of the nozzle 54. Further, the nozzle holes are directed such that they are roughly in the same direction as the direction of the swirl of the scavenge air in the combustion chamber caused by the configuration of the scavenge ports (this swirl is a well-known feature of large two-stroke turbocharged internal combustion engines of the uniflow type).

The nozzle 54 is connected to the front end of the valve housing 52 with a sleeve 57 securing and surrounding a portion of the nozzle body 55, surrounding an intermediate section 53 and surrounding a distal portion of the elongated valve housing 52. The nozzle body 55 is provided with a longitudinal bore in which the valve needle 61 is received. The longitudinal bore has a diameter that is larger than the diameter of the valve needle 61 in the portion of the longitudinal bore closest to the tip 56. The space between the longitudinal bore and the valve needle 61 forms a fuel cavity 58. An intermediate section of the longitudinal bore has a very small clearance with the valve needle 61. The portion of the longitudinal bore in the nozzle body 55 most distant from the tip 56 of the nozzle 54 has an enlarged diameter matching and an enlarged diameter portion of the valve needle 61. The enlarged diameter portion of the valve needle 61 forms a needle actuation piston 62 with a pressure surface of the needle actuation piston 62 facing a needle actuation chamber 88 in the nozzle 54. The needle actuation chamber 88 is fluidically connected to the control port 86 via a control conduit 87.

The enlarged diameter section of the longitudinal bore is aligned with a spring chamber 96 in the intermediate section 53. The spring chamber 96 is aligned with a longitudinal bore in the elongated valve housing 52. The distal section of the longitudinal bore in the elongated valve housing 52 closest to the distal end of the elongated valve housing 52 has a diameter that corresponds to the diameter and the spring chamber 96. A helical wire spring 68 extends between distal section of the longitudinal in the elongated valve housing 52 and the enlarged diameter section 62 of the valve needle 61. The valve needle 61 is resiliently biased towards its closed position by the pre-tensioned helical spring 68. The helical spring 68 is a helical wire spring that is received in a spring chamber 96 in the elongated fuel valve housing 52. The helical wire spring 68 biases the valve needle 61 towards the tip 56 of the nozzle 54, i.e. to its closed position. In the closed position of the valve needle 61 the, preferably conical, tip of the valve needle 61 abuts with a preferably conical seat 63 in the tip 56 of the interior of the nozzle 54 and closes the fluidic connection between the fuel cavity 58 and the nozzle holes. The fluidic connection between the fuel cavity 58 and the nozzle holes is established when the valve needle 61 has lift, i.e. when the valve needle 61 is forced towards the proximate end of the fuel valve 50 against the bias of the helical spring 68. The valve needle 61 gets lift when the needle actuation chamber 88 is pressurized.

A spring guide 69 extends concentrically in the spring chamber 96 for guiding the helical spring 68. The proximate end of the spring guide 69 is sealingly received in the longitudinal bore in the elongated valve housing 52.

The axially displaceable valve needle 61 is slidably received with a narrow clearance in a longitudinal bore in the nozzle body 55, and lubrication between the axially displaceable valve needle 61 and the longitudinal bore is critical. Hereto, pressurized sealing liquid is delivered to the clearance between the longitudinal bore in the valve needle via a conduit (channel) 93. The channel 93 connects the clearance between the valve needle 61 and the longitudinal bore to a sealing liquid inlet port 70, which in turn can be connected to the source of pressurized sealing liquid. The connection between the clearance and the channel 93 includes a transverse bore 99 (FIG. 8) in the valve needle 61 that connects to an axial bore 97 (FIG. 8) in the valve needle 61 that extends all the way through the enlarged diameter section that forms the needle actuation piston 62 to the spring chamber 96. The channel 93 connects to the spring chamber 96 and supplies the spring chamber 96 with pressurized sealing liquid. In order to allow a substantial flow of sealing liquid through the spring chamber 96 so that the sealing liquid may act as a cooling medium the spring chamber 96 is connected via a bore to a sealing liquid outlet port 95. The sealing liquid prevents leakage of low flashpoint fuel through the clearance between the valve needle 61 and the axial bore and provides cooling to the fuel valve 50. Further, the sealing liquid, which is preferably an oil, provides for lubrication between the valve needle 61 and the longitudinal bore.

The elongated valve housing 52 is provided with a fuel inlet port 76 for connection to a source of pressurized low flashpoint liquid fuel 60, for example via the low flashpoint liquid fuel supply conduit 31. The fuel inlet port 76 connects to a pump chamber 82 in the valve housing 52 via a conduit 73 in a pump piston 80 and a one-way valve 89. The one-way valve 89 (suction valve) is provided in the pump piston 80 at an inlet 71 of the conduits 73. The one-way valve 89 is a spring loaded poppet valve that ensures that liquid low flashpoint fuel can flow from the fuel inlet port 76 via conduit 73 to the pump chamber 82, but not in the opposite direction. The fluidic connection between the conduit 73 in the pump piston 80 and the fuel inlet port 76 in the elongated housing 52 is established by a receded area 74 in the pump piston 80 that in axial direction overlaps with the bore in the elongated housing 52 that forms the fuel inlet port 76.

The pump piston 80 is slidably and sealingly received in a first bore 81 in the elongated fuel valve housing 52 with a pump chamber 82 in the first bore 81 on one side of the pump piston 80. An actuation piston 83 is slidably and sealingly received in a second bore 84 in the valve housing 52 with an actuation chamber 85 in the second bore 84 on one side of the actuation piston 83. The pump piston 80 is connected to the actuation piston 83 to move in unison therewith, i.e. the pump piston 80 and the actuation piston 83 can slide in unison their respective bores 81,84. In the present embodiment the pump piston 80 and the actuation piston 83 are formed as a single body. However, it is noted that the pump piston 80 and the actuation piston 83 can be separate interconnected bodies.

The actuation chamber 85 is fluidically connected to an actuation fluid port 78. The first control valve 41 controls the flow pressurized actuation liquid to and from the actuation fluid port 78 and thereby to and from to the actuation chamber 85.

A lead time before the start of injection event, the electronic control unit 25 commands the first control valve 41 to allow high pressure actuation liquid into the actuation chamber 85. At this moment the actuation piston 83 and pump piston 80 combination is in the position shown in FIG. 6. The pressurized actuation liquid in the actuation chamber 85 acts on the actuation piston 83, thereby creating a force that urges the pump piston 80 into the pump chamber 82. Thereby, the pressure of the low flashpoint liquid fuel in the pump chamber 82 increases. In an embodiment the diameter of the actuation piston 83 is larger than the diameter of the pump piston 80 and thus the pressure in the pump chamber 82 will be correspondingly higher than the pressure in the actuation chamber 85 and the combination of the actuation piston 83 and pump piston 80 acts as a pressure booster.

Figure 6:
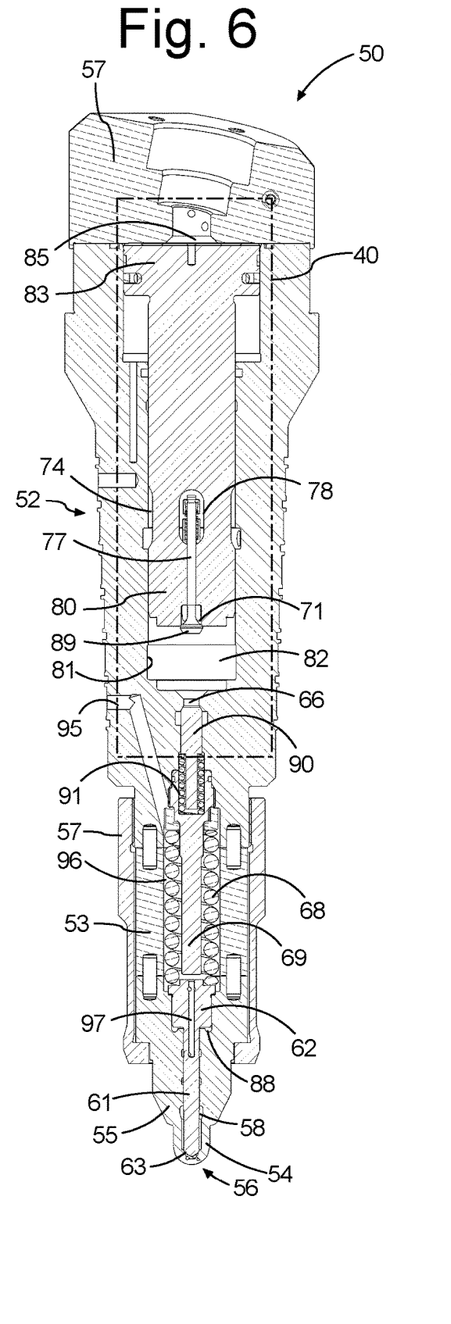
FIGS. 6 to 9 are sectional views of the fuel valve of FIG. 5.
Figure 7:
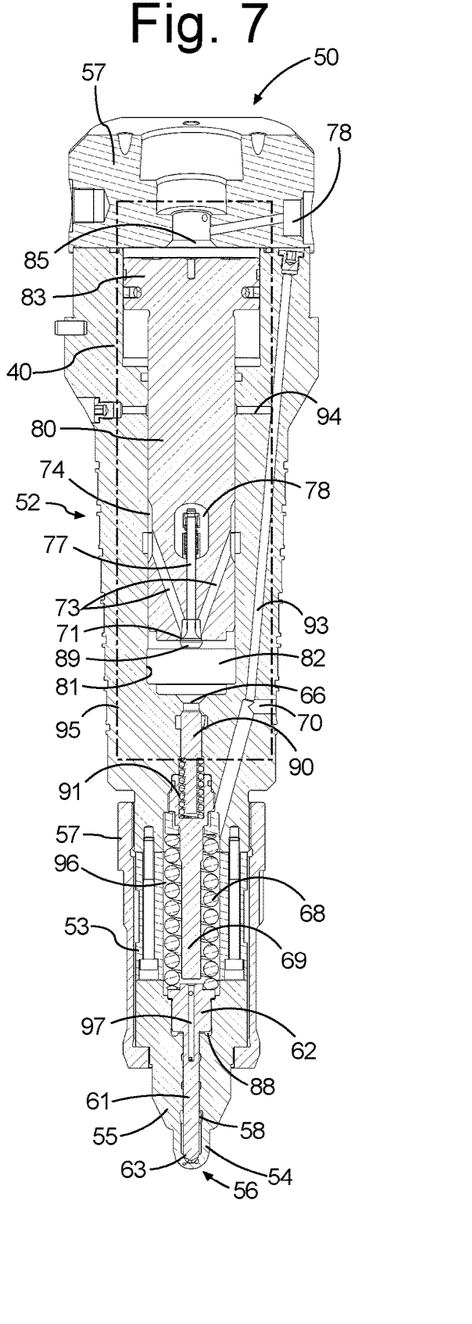

One or more fuel channels 79 fluidically connect the pump chamber 82 to the fuel cavity 58 and thereby to the valve seat that is located at the bottom of the fuel cavity 58. A one-way valve 90 is placed between the fuel channels 79 and the pump chamber 82. The outlet 66 of the pump chamber 82 is connected to the inlet of the one-way valve 90. The one-way valve 90 comprises a valve member slidably received in an axial bore in the elongated valve housing 52 and the valve member is resiliently biased towards its seat, i.e. towards its closed position and prevents backflow of fuel from the fuel channel 79 into the pump chamber 82. The pressurized fluid in the actuation chamber 85 will cause the actuation piston 83 and the pump piston 80 to move downwards (downwards as in FIGS. 6 to 9) as shown in FIG. 7. The pressure in the pump chamber 82 will after a short compression phase be the product of the ratio between the effective pressure area of the pump piston 80 and the effective pressure area of the actuation piston 83 and the pressure in the actuation chamber 85. At this moment the pressure in the actuation chamber 85 will be substantially equal to the pressure of the source of high pressure fluid. With an effective pressure surface ratio of e.g. 2,5:1 and a supply pressure of the hydraulic system of 200 bar the pressure in the fuel in pump chamber will be approximately 500 bar at the end of the compression phase. Thus, the combination of the actuation piston 83 and pump piston 80 acts as a pressure booster.

The electronic control unit 25 pressurizes the actuation chamber 85 before the start of the fuel injection by a lead time sufficient to ensure that the pressure in the pump chamber 82 has reached the required injection pressure of e.g. 500 bar. The electronic control unit 25 determines when the valve needle 61 needs to lift and thus when the fuel injection commences. The valve needle 61 is configured to move in the direction away from the nozzle 54 to obtain lift, and towards the nozzle 54 to reduce lift. The valve needle 61 gets lift when the valve actuation chamber 88 is pressurized. The electronic control unit 25 instructs the second control valve 45 to connect the fuel valve actuation signal conduit 48 to the source of high pressure hydraulic fluid at the moment in the engine cycle when the fuel injection has to commence. The fuel valve actuation signal conduit 48 is connected to the control port 86 and the high pressure fluid reaches the valve actuation chamber 88 via control conduit 87. When the valve needle 61 has lift from its seat it allows flow of low flashpoint liquid fuel from the fuel cavity 58 through the nozzle holes into the combustion chamber.

Figure 8:
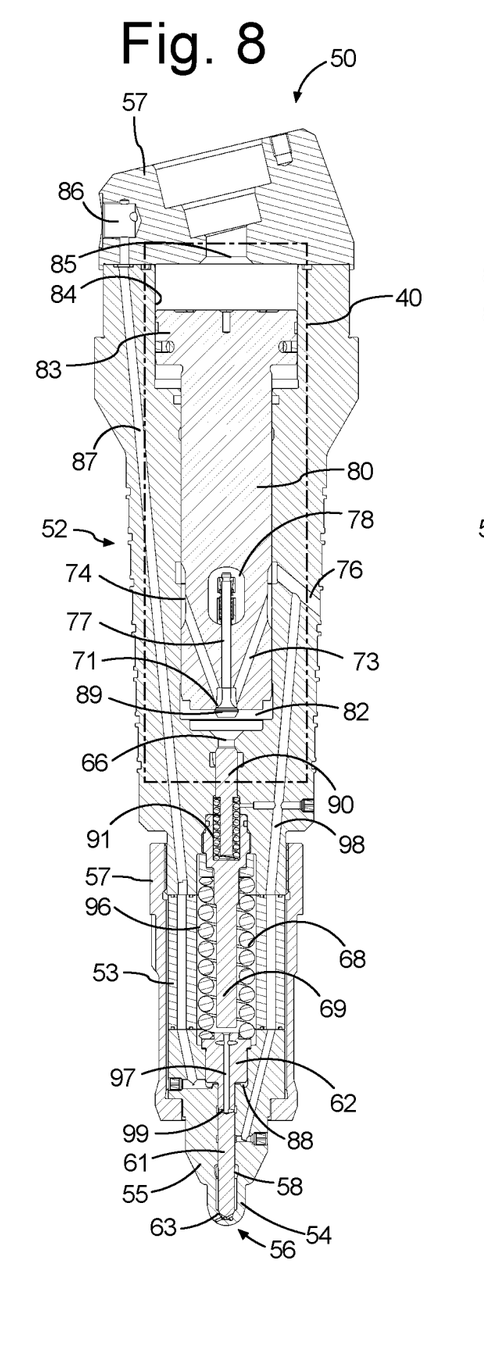
Figure 9:
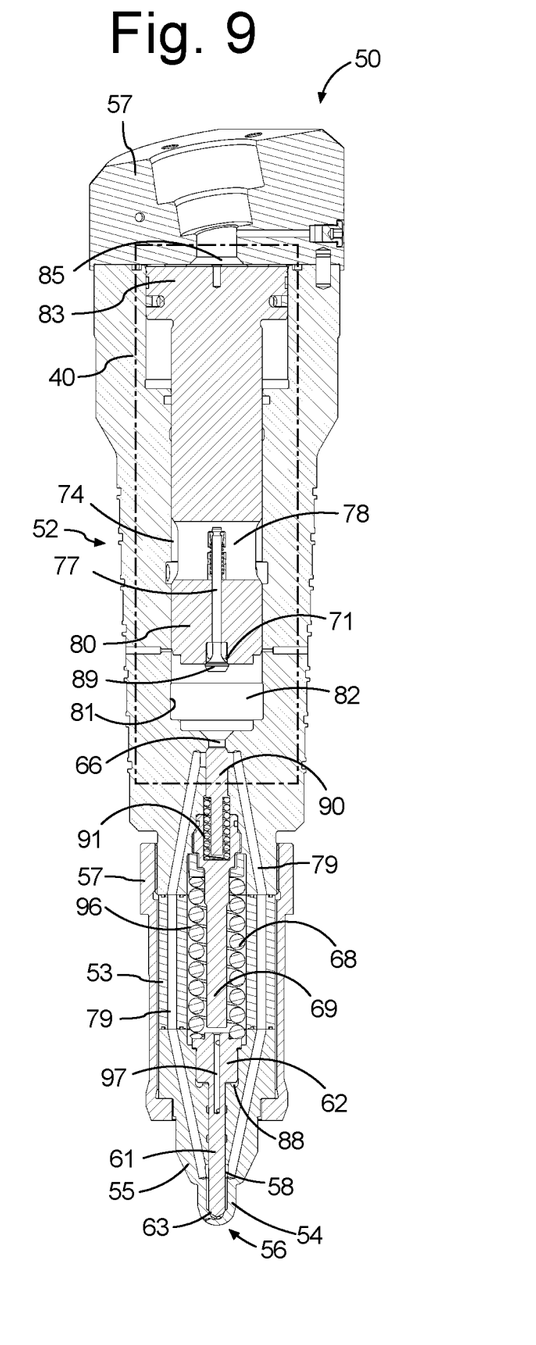

The electronic control unit 25 ends an injection event by instructing the second control valve 45 to connect the valve actuation chamber 88 to tank and thereupon the valve needle 61 returns to its seat and prevents further injection of fuel. Simultaneously or shortly thereafter, the electronic control unit 25 instructs the first control valve 41 to connect the actuation chamber 85 to tank. The pump chamber 82 is connected to the pressurized source of low flashpoint fuel 30 and the supply pressure of the low flashpoint liquid fuel that flows in via the one-way valve 89 urges the actuation piston 83 into the actuation chamber 85 until it has reached the position that is shown in FIG. 6 with the pump chamber 82 completely filled with low flashpoint liquid fuel so that the fuel valve 50 is ready for the next injection event. FIG. 8 shows the position of the pump piston 80 and the actuation position 83 near the end of an injection event with a major part of the pump chamber 80 depleted from low flashpoint fuel.

An injection event of the low flashpoint fuel is controlled by the electronic control unit 25 by the timing and the duration of lift of the valve needle 61. The electronic control unit can also control the injection event by regulating the pressure supplied to the actuation chamber 85 in order to perform rate shaping.

The fuel valve 50 is provided with a sealing liquid inlet port 70 for connection to a source of pressurized sealing liquid and provided with a bore 94 extending from the sealing liquid inlet port 70 to the first bore 81 for sealing the pump piston 80 in the first bore 81 in order to prevent the high-pressure fuel in the pump chamber 82 from leaking into the space under actuation piston 83. In an embodiment, the pressure of the source of sealing liquid is at least as high as the maximum pressure in the pump chamber 82 during an injection event. In another embodiment the pressure of the source of sealing liquid is at least as high as the supply pressure of the low flashpoint fuel.

The sealing liquid is provided to the clearance between the longitudinal bore and the valve needle 61 via transverse bore 99 needs only to seal against the supply pressure of the fuel since the fuel inlet port 76 is connected to a low-pressure fuel conduit 98 that extends from the fuel inlet port 76 through the elongated valve housing 52, through the intermediate section 53 into the nozzle body 55 and to the longitudinal bore in which the valve needle 61 is slidably received. The position at which the low-pressure fuel conduit 98 connects to the longitudinal bore is axially between the position where the fuel channels 79 connects to the longitudinal bore and the position where the transverse bore 99 connects to the longitudinal bore. Thus, any low flashpoint fuel leaking upwards (upward as in FIGS. 6 to 9)) through the clearance between the longitudinal bore and the valve needle 61 from the high pressure fuel cavity 58 during an injection event will have its pressure reduced to the much lower fuel feed pressure when it reaches the position where the low-pressure fuel conduit 98 connects to the longitudinal bore. Thus, the low-pressure in the fuel conduit 98 "punctures" the pressure of the fuel in the clearance between the valve needle 61 and the longitudinal bore and thus, the sealing liquid from the transverse bore 99 needs only to seal against the feed pressure of the low flashpoint fuel and not against the injection pressure. Thus, the pressure of the sealing oil needs only to be marginally higher than the feed pressure of the low flashpoint fuel and does not need to be as high or higher than the injection pressure of the fuel.

FIG. 10 shows an alternative type of nozzle 54 for use with the fuel valve 50 described above with reference to FIGS. 5 to 9. In this embodiment the nozzle 54 is of a so-called slider type in which the valve seat 63 is arranged at a distance from the tip 56 of the nozzle 54 and the tip 56 of the nozzle is in this embodiment closed, i.e. the tip 56 does not have any nozzle holes. Instead, the nozzle holes are arranged along the length of the nozzle starting at a position close to the tip 56 going upwards (upward as in the orientation of FIG. 10). The valve needle 61 is provided with a conical section that cooperates with the valve seat 63 and a slider section that extends from the conical section of the valve needle 61 towards the tip of the valve needle 61. This type of nozzle with a closed tip and a slider of the valve needle 61 extending inside the nozzle 54 towards the tip 56 is well known in the art and will therefore not be described in any greater detail.

Figure 11:
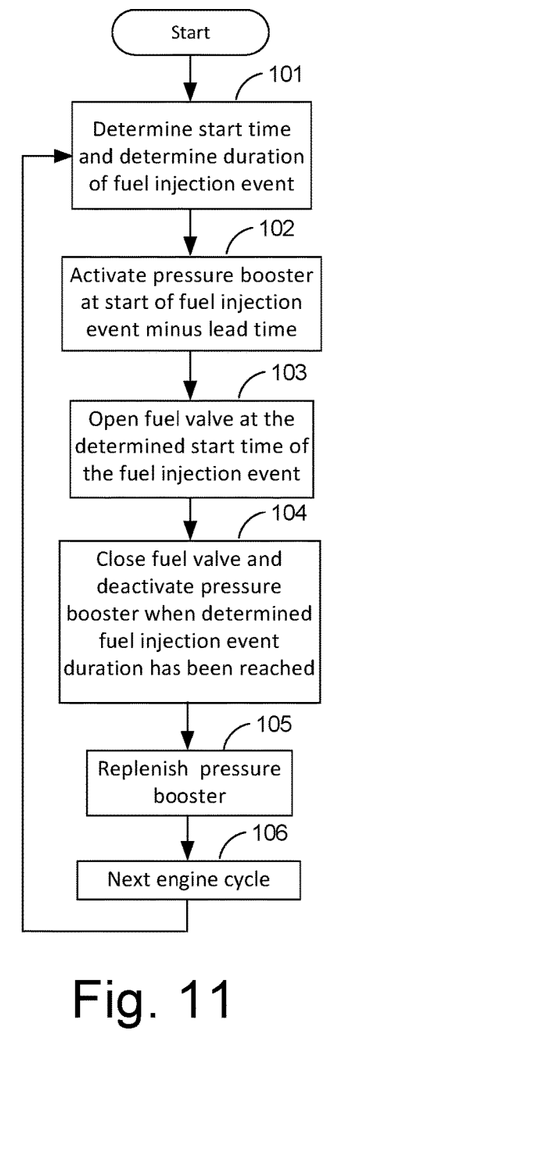
FIG. 11 is a flow chart illustrating a method for injecting low flashpoint fuel into the engine of FIGS. 1 and 2.

FIG. 11 is a flowchart illustrating a method according for injecting a low flashpoint fuel into the combustion chamber of a large two-stroke compression ignited internal combustion engine.

At the start of the method, block 101, the start time and the duration of the next fuel injection event is determined, for example by an electronic control unit 25 of the engine. The electronic control unit 25 determines the start time and duration of the injection on the basis of various signals, such as e.g. engine load, engine speed, scavenging pressure and fuel properties.

Thereafter, block 102, the pressure booster 40 is started, e.g. by a signal from the electronic control unit 25 to the first control valve 41 to change position, ahead of the planned start time of the fuel injection event in order to give the pressure booster 40 time to build up pressure in the relatively compressible low flashpoint fuel in the pump chamber. The change of position of the first control valve 41 causes the actuation chamber of the pressure booster 40 for it to be pressurized and thereby pressurize the low flashpoint fuel in the pump chamber of the pressure booster 40.

Next, block 103, the fuel valve 50 is opened at the determined start time of the fuel injection event. This step can be carried out by the electronic control unit 25 sending a signal to the second control valve 45 to change position so that the needle actuation chamber 88 is pressurized, thereby lifting the valve needle 61.

The fuel valve 50 is closed, block 104, when the determined duration of the fuel injection event has been reached. Hereto, the electronic control unit 25 issues a signal to the second control valve 45 to return to the position where the needle actuation chamber 88 is connected to tank, so that the valve needle 61 returns to its seat.

Simultaneously, or shortly thereafter, block 105, the electronic control unit 25 issues a signal to the first control valve 41 to connect the actuation chamber of the pressure booster 42 tank, so that the pressure booster 40 makes a return stroke, thereby refilling the pump chamber 82 with low flashpoint fuel.

Thereupon, an injection event has been completed and the method cycles back to block 101.

The signal cables mentioned above can be replaced by wireless connections. The actuation of the valve needle 61 under control of the electronic control unit can be achieved in other ways than with a hydraulic control signal, such as e.g. with an electric actuator acting on the valve needle 61.

The present concept is not restricted to high compressibility fuels and neither to low flash point fuels. In practice the concept may offer most advantages when high compressibility of the fuel does not allow to let the needle opening injection pressure control the lift of the needle itself.

The aspects have been described in conjunction with various embodiments herein. However, other variations to the disclosed embodiments can be understood and effected by those skilled in the art in practicing the claimed aspects, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A fuel valve for injecting low flashpoint liquid fuel into the combustion chamber of a large slow running two-stroke turbocharged self-igniting internal combustion engine, said fuel valve comprising:
   an elongated valve housing with a rear end and a front end,
   a nozzle with a plurality of nozzle holes, said nozzle being disposed at the front end of said elongated valve housing,
   a fuel inlet port in said elongated valve housing for connection to an external source of pressurized low flashpoint fuel,
   a control port in said fuel valve for connection to an external source of control fluid,
   an actuation fluid port in said elongated valve housing for connection to an external source of actuation fluid,
   an axially displaceable valve needle slidably received in a longitudinal bore in said fuel valve, said valve needle having a closed position and an open position and said valve needle being biased towards said closed position,
   said valve needle allowing flow of fuel from a fuel cavity to said plurality of nozzle holes when the valve needle is in its open position and said valve needle preventing flow of fuel from said fuel cavity to said plurality of nozzle holes when the valve needle is in its closed position,
   said valve needle being operably connected to a needle actuation piston with a pressure surface of said needle actuation piston facing a needle actuation chamber in said fuel valve, said needle actuation chamber being fluidically connected to said control port in said fuel valve,
   a pump piston received in a first bore in said valve housing with a pump chamber in said first bore on one side of said pump piston,
   an actuation piston received in a second bore in said elongated valve housing with an actuation chamber in said second bore on one side of said actuation piston, said pump piston being connected to said actuation piston to move in unison therewith,
   said actuation chamber being connected to said actuation fluid port, and
   said pump chamber having an outlet fluidically connected to said fuel cavity and an inlet fluidically connected to said fuel inlet port.

2. A fuel valve according to claim 1, further comprising a sealing liquid inlet port for connection to a source of pressurized sealing liquid, and a conduit connecting said sealing liquid inlet port to said first bore for sealing said pump piston in said first bore.

3. A fuel valve according to claim 1, further comprising a conduit connecting said sealing liquid inlet port to said longitudinal bore for sealing said valve needle in said longitudinal bore).

4. A fuel valve according to claim 1, wherein said nozzle is part of a nozzle body that is secured to the front of said elongated valve housing.

5. A fuel valve according to claim 1, wherein said inlet is located in said pump piston.

6. A fuel valve according to claim 1, wherein a first one-way valve is provided in said inlet, said first one-way valve being configured to allow flow of low flashpoint fuel through said inlet into said pump chamber and to prevent flow from said pump chamber into said inlet.

7. A fuel valve according to claim 6, wherein a second one-way valve is provided in said one or more fuel channels, said second one-way valve being configured to allow flow of low flashpoint fuel from said pump chamber to said fuel cavity and to prevent flow from said fuel cavity to said pump chamber.

* * * * *